(12) United States Patent
Pérez Díaz et al.

(10) Patent No.: US 11,808,673 B2
(45) Date of Patent: Nov. 7, 2023

(54) APPARATUS AND METHODS FOR SAMPLING AIR-BORNE PARTICLES

(71) Applicants: COUNTERFOG CORPORATION, Irving, TX (US); CONSEJO SUPERIOR DE INVESTIGACIONES CIENTÍFICAS, Madrid (ES)

(72) Inventors: José Luis Pérez Díaz, Valdemoro (ES); Antonio Alcamí Pertejo, Madrid (ES)

(73) Assignees: COUNTERFOG CORPORATION, Irving, TX (US); CONSEJO SUPERIOR DE INVESTIGACIONES CIENTÍFICAS, Madrid (ES)

( * ) Notice: Subject to any disclaimer, the term of this patent is extended or adjusted under 35 U.S.C. 154(b) by 47 days.

(21) Appl. No.: 17/687,066

(22) Filed: Mar. 4, 2022

(65) Prior Publication Data
US 2023/0314288 A1    Oct. 5, 2023

(51) Int. Cl.
*G01N 1/22*    (2006.01)

(52) U.S. Cl.
CPC ......... *G01N 1/2208* (2013.01); *G01N 1/2273* (2013.01); *G01N 2001/2217* (2013.01)

(58) Field of Classification Search
CPC ............... G01N 1/2208; G01N 1/2273; G01N 2001/2217
See application file for complete search history.

(56) References Cited

U.S. PATENT DOCUMENTS

| | | | |
|---|---|---|---|
| 4,281,066 A * | 7/1981 | Thran | C12M 33/04 435/309.1 |
| 2011/0159596 A1 | 6/2011 | Keinan et al. | |
| 2022/0170854 A1* | 6/2022 | Saunders | G01N 1/4022 |

FOREIGN PATENT DOCUMENTS

| | | |
|---|---|---|
| EP | 3150993 B2 | 4/2017 |
| JP | 6374638 B2 | 8/2018 |

OTHER PUBLICATIONS

Haig et al., "Bioaerosol sampling: sampling mechanisms, bioefficiency and field studies", Journal of Hospital Infection 93 (2016) pp. 242-255.

(Continued)

*Primary Examiner* — David Z Huang
(74) *Attorney, Agent, or Firm* — Edell, Shapiro & Finnan, LLC

(57) ABSTRACT

Disclosed are apparatus and methods for sampling air-borne particles. According to one embodiment a nozzle is used to generate a jet of fog that includes a gas and liquid droplets of different sizes. The jet of fog is formed by the nozzle in a way to cause particles in the air surrounding the jet of fog to be drawn into the jet of fog and to further cause the particles to aggregate with the liquid droplets inside the jet of fog. A sample collecting surface is located opposite and spaced apart from an outlet of the nozzle. The sample collecting surface is preferably sloped so that the liquid sample can be forced by gravity off the collecting surface and into a vial or other liquid sample container. Inside the jet of fog and on the sample collection surface the liquid droplets merge with one another to form larger sized droplets that are collectable in the liquid sample container.

18 Claims, 9 Drawing Sheets

(56) References Cited

OTHER PUBLICATIONS

Verreault, et al., "Methods for Sampling of Airborne Viruses", Microbiology and Molecular Biology Reviews, 72 Sep. 2008, pp. 413-444.
Chia et al., "Detection of air and surface contamination by SARS-CoV-2 in hospital rooms of infected patients", Nature Communications (2020), 7 pages.
Liu et al., "Aerodynamic analysis of SARS-CoV-2 in two Wuhan hospitals", Nature, vol. 582, Jun. 25, 2020, 7 pages.
Zhou et al., "Investigating SARS-CoV-2 surface and air contamination in an acute healthcare setting during the peak of the COVID-19 pandemic in London", Clin. Infect. Dis. 2020, 73, e1870-e1877, 22 pages.
Ratnesar-Shumate et al., "Comparison of the Performance of Aerosol Sampling Devices for Measuring Infectious SARS-CoV-2 Aerosols.", Aerosol Sci. Technol. 2021, 55, pp. 975-986.
Burton et al., "Physical Collection Efficiency of Filter Materials for Bacteria and Viruses.", Ann. Occup. Hyg. 2007, 51, pp. 143-151.
Perez Diaz, et al., "Fast surface disinfection with Counterfog® SDR-F05A+", The European Physical Journal Plus, (2021) 136:393, 8 pages.
International Search Report and the Written Opinion, PCT/EP2023/054370, dated May 8, 2023, 7 pages.
International Written Opinion, PCT/EP2023/054370, dated May 8, 2023, 10 pages.

\* cited by examiner

APPARATUS AND METHODS FOR SAMPLING AIR-BORNE PARTICLES

FIELD

Disclosed are apparatus and methods directed to collecting air-borne particles using a jet of fog and aggregating the air-borne particles with liquid droplets in the jet of fog to produce a liquid sample that can be later analyzed or studied. The apparatus and methods are particularly adapted to producing liquid samples containing tiny air-borne particles having an aerodynamic diameter smaller than one micron (micrometer). Example air-borne particles include, but are not limited to, viruses, spores, fungi, yeasts and bacteria. The apparatus and methods disclosed herein are also applicable to monitoring the presence of chemicals and pollutants. Sampling can occur both outdoors and indoors, and in all types of buildings or enclosures including hospitals, factories, public transportation vehicles (e.g., railway car, aircrafts, ships, etc.) tunnels and mines. Additionally, the apparatus and methods disclosed and contemplated herein may also be used strictly for the purpose of removing pollutants and pathogens from air.

BACKGROUND

Air-borne matter such as viruses, spores, bacteria, fungi, yeast, microorganisms and pathogens in general have a great impact on public health since they may be a direct source of diseases, mainly respiratory ones. Airborne matter can also have a negative impact in other sectors like those using clean-room processes. Air-borne matter in mines is also problematic.

There is a clear need of rapidly detecting the presence of air-borne fine and ultrafine particulate matter to prevent diseases and their transmission. Knowledge on the presence of pathogens in air is key to undertake appropriate measures to fight an air-transmitted disease.

It is important to remark that measuring a pollutant is not always enough to determine others. For example, Particulate Matter (PM) is not enough to extrapolate the emergent Ultra Fine Particulate Matter (UFPM) as there is very little or no relationship between UFPM concentrations and other PM—due to their different origin and their different behavior in the ambient air as explained for instance by Casee (F. R. Cassee et al. White Paper Ambient ultrafine particles: evidence for policy makers, version 1, 25th Oct 2019,https://efca.net/files/WHITE %20PAPERUFP %20evidence %20for %20policy %20maker s%20(25%200CT).pdf).

Particles are drawn by air due to its viscosity according to the Navier-Stokes as is for example described in Lamb H. (1994), "Hydrodynamics" Cambridge University Press (6$^{th}$ Edition). It can be derived the total viscous force exerted by the flow of air onto a rigid sphere to be: $\vec{F}_v = 6\pi R \mu \vec{V}$ where $\mu$ is viscosity of air, V is the velocity of the air relative to the sphere and at an infinite distance of it and R is the radius of the sphere (i.e. spherical particle).

Sedimentation velocity of airborne particles, including microbes, depends inter alia on the square of the particle diameter. Hence, for particles of 100, 10, 3, 1, and 0.5 µm diameters, the expected half-life times in air in the gravitational field on Earth are 5.8 s, 8.2 min, 1.5 h, 12 h, and 41 h, respectively.

Penetration in the respiratory tract of particles drawn by viscosity of air is known to be highly dependent on the size of the particle. At least 50% of such particles may be deposited as follows: 7-11 µm—nasal and oral cavities, 4.7-7 µm—pharynx, 3.3-4.7 µm—trachea and primary bronchi, 2.1-3.3 µm—secondary bronchi, 1.1-2.1 µm—terminal bronchi, 0.65-1.1 µm—bronchioles and <0.65 µm—alveoli. Furthermore, Ultra Fine Particles penetrate through alveoli and cellular walls into blood, cytoplasm, and mitochondria as described by Froines (J. Froines, "Ultrafine Particle Health Effects", Ultrafine Particles Conference, AQMD, 2006). Particles sized under 0.1 nm—classified as nanomaterials—present chemical properties quite different from those of bulk materials becoming increasingly toxic as their size shrinks according to Nel (A. Nel et al. Toxic Potential of Materials at eh Nanolevel, Science 311, 622 (2006)). Carbon black or TiO2 are examples of materials whose bulk forms are inert, but their nanoparticles have demonstrated to be toxic, inducing lung injury (G. Oberdörster et al., Environ. Health Perspect. 113, 823 (2005)). Several mechanisms have been suggested depending on the composition of the nanoparticles, as well as the synergic presence of other chemical compounds like VOC.

Airborne transmission of pathogens is relevant in respiratory infections, contributing to the spread of pathogens and the control of pandemics. 125 nm SARS-Cov-2 virions or 800 nm Anthrax spores are well able to remain floating in air and penetrate deep into alveoli (Wang, Chia C et al. "Airborne transmission of respiratory viruses." Science, New York, vol. 373, 6558 (2021): eabd9149. doi:10.1126/science.abd9149). Additionally, an oscillatory CO2-O2 exchange inertial effect on nano-sized particles associated to respiration has been suggested as a key "mechanical" factor for infectivity of these nano-sized pathogens (Pérez-Diaz J L, Possible human alveoli to alveoli transmission mechanism for Covid-19 under quiet normal breathing conditions April 2020 DOI: 10.13140/RG.2.2.23613.41448)

Current air samplers can be classified according to their sampling operational principle, such as, filtration, electric force, inertial/gravitational and condensation.

Filtration of the fine particles like viruses require a filter material with pores of a size similar to or smaller than the particles to capture. For example, CSIC recently developed an air sampling device with polytetrafluoroethylene (PTFE) filters to capture air microbiota and has demonstrated its efficiency to detect complex communities of microorganisms and viruses (metagenomics), and to identify airborne SARS-CoV-2 in hospitals [European Patent Application EP20382510.4, 12/06/20. PCT/EP2021/065932 14/06/21]. However, it typically requires a sampling time of one or two hours and the filter dries excessively compromising a precise determination of viability of air-borne microorganisms and particularly of viruses.

Electric forces are used for instance in U.S. Pat. No. 7,201,879 B2 and in U.S. Pat. No. 7,631,567 B1. However, electrophoresis in air is slow and strongly depends on humidity and temperature. Additionally, electric forces may denaturalize biological material.

Inertial/gravitational-type samplers include impactors, impingers, and cyclones as summarized, for example, by Haig (Haig C W, Mackay W G, Walker J T, Williams C. Bioaerosol sampling: sampling mechanisms, bioefficiency and field studies. J Hosp Infect. 2016; 93(3):242-255. doi: 10.1016/j.jhin.2016.03.017).

Impactors like those described in U.S. Pat. No. 9,328,322 B2, U.S. Pat. No. 6,688,187 B1 and U.S. Pat. No. 9,702,000 B2 use a drastic change in direction or acceleration of the air flow to cause air-borne particles to drift. However, fine particles possess low inertial forces. For this reason, impactors are not suitable for the finest of particles, such as viruses.

Impingers, like those sold by All-Glass Impinger (Ace Glass Inc., Vineland, NJ, USA), the BioSampler (SKC Inc., Covington, GA, USA) and the Multistage Liquid Impinger (Burkard Manufacturing Co. Ltd, Rickmansworth, UK) pump air to be sampled into a recipient containing liquid therefore generating bubbles. Particles in the bubbles are expected somehow to touch the boundaries of the bubbles and pass to the liquid. This is not effective for very fine particles as they do not move independently of the air.

Cyclone samplers force air into a spiral swirling flow by the shape of the collection chamber. Examples of cyclone samplers are provided in U.S. Pat. Nos. 9,328,322 B2, 6,087,183, 6,688,187 B1 or 7,964,018 B2. In a cyclone, when observed from the rotational frame of reference, particles experience a centrifugal force towards the cyclone wall where they are separated from the air flow onto a liquid film that may flow and be collected. The centrifugal force is proportional to the mass of the particle (and therefore its volume) and the square of the rotational angular velocity. However, the mentioned viscous forces of air will dampen and prevent the particles to escape centrifugally. Ratio between viscous dampening force and centrifugal force scales as $1/R^2$, where R is the radius of the spherical particle. This means again, that this works for larger particles and not for smaller particles. In regard to smaller particles (e.g. viruses), viscous forces of air exceed centrifugal forces preventing them to drift outward to the wall. Centrifugal terminal velocity can be approximated as $2/9\ R^2\omega^2 r\rho/\mu$ where $\mu$ is viscosity of air, $\omega$ is angular velocity of the cyclone, $\rho$ is density of the particle, R is the radius of the particle and r is the distance from the axis of the cyclone to the particle.

If the axial component of velocity in the cyclone is called $v_z$ then the maximal radial distance centrifuged for a particle of radius R (equivalently thickness of scavenged layer) can be estimated as: $2/9\ R^2\omega^2\rho/\mu r\ h/vs$ where h is the height of the cyclone. A quick calculation that assumes a cyclone having a 200 mm diameter and 100 mm height, in addition to a particle angular velocity of 10 rad/s and axial component of velocity $v_z=1$ m/s reveals that a centrifuged distance of around 3 mm is obtained for a 10 micron particle. However, for a particle having a diameter of 1 micron, a centrifuged distance of about 30 microns is obtained.

The finest particles, such as viruses, just follow the swirl and mostly escape being captured. As it is evident from the rational above, cyclone type devices try to maintain a high rotational angular speed compared to the axial component of velocity $v_z$ in order to keep the air and particles rotating a longer residential time and to achieve longer radial distance centrifuged. However, the sampled flow is proportional to the axial component of velocity $v_z$ and cannot be made too small in practice.

A significant technical challenge is to develop methods that capture UFPM (nanoscale size particles—less than 1 μm or 100 nm in diameter), viruses and retain viral infectivity. To date, only two sampling technologies have demonstrated the capture of viable SARS-CoV-2: VIVAS condensation system and PTFE filters developed by CSIC. However, these technologies require quite a few tens of minutes or hours to sample effectively, mainly because of the low volume flow of air sampling.

An intent of the present application is to disclose an approach to a method and apparatus to quickly sample air-borne matter for both outdoor and indoor locations.

SUMMARY

Disclosed are methods and apparatus to fast sample air-borne matter such as, microorganisms and pollutants, including, but not limited to Ultra Fine Particles and pathogens that are smaller than 1 micron, collecting them from a high volume of air into a liquid sample in a short period of time, for application both outdoors and indoors. Analytical technologies can then be used later for measuring or detecting pathogens, virus, particles, microorganisms or chemicals in the liquid samples. It can be used for fast detection of air-borne pathogens and pollutants in buildings, vehicles, mines, vessels, clean rooms, hospitals, farms, industries, etc. as well as outdoors for environmental and atmospheric surveying, etc. Additionally, it provides the benefit of removing the sampled pollutants or pathogens from air bringing them into a liquid and preventing them to spread or to be breathed in.

According to one implementation, the air-borne particles are collected as a liquid suspension. The sampled volume is typically at least 50 times larger than the current state of the art sampling systems. For example, according to some implementations air containing particles that surround a jet of fog is drawn into the jet of fog at 0.017 $m^3$/s to 2.0 $m^3$/s. Once collected, the liquid suspension can be submitted for immediate analysis without being filtered or processed in any additional way. This increases the efficiency of the process and results in lower cost sampling systems. Example analytical or detection technologies suitable for directly receiving a liquid suspension are PCR (polymerase chain reaction), antibodies or selective aptamers undergoing a physical change like color in case of detection of a specific pathogen, culturing, reagents, etc. It is a great advantage to provide directly a liquid sample as a suspension as most of the available analytical techniques work with a liquid sample.

Provided are methods and apparatus to fast sample airborne matter such as, pathogens and pollutants using a cone-shaped open jet of fog. The jet of fog is produced by a nozzle and comprises nano-sized liquid droplets that draw in air around the cone. (The term "open jet of fog" meaning that there is no mechanical structure located between the jet of fog and the air that surrounds it so that the surrounding air can be drawn into the jet of fog about its entire circumference) The jet of fog is produced by a nozzle that is configured to produce the nano-sized liquid droplets in a way that promotes a capturing of particles (pathogens, pollutants, etc.) from the surrounding air in the liquid droplets as the surrounding air is drawn into the jet of fog. In the jet of fog the liquid droplets aggregate/merge as they travel towards a funnel and/or impaction surface where the merged droplets are collected. As the liquid droplets dynamically merge, larger droplets are produced that are easier to be collected by inertial methods like, for example, simple impaction on a surface of the funnel that faces towards the nozzle. (The term "open jet of fog" also means that there is no mechanical structure located between the outlet of the nozzle and the funnel and/or impaction surface.)

These and other features of the disclosed implementations are described in detail below, in view of the figures, which are a part of this specification.

DETAILED DESCRIPTION

Fog is a suspension of tiny droplets of liquid in a gas, typically fogs made of water droplets in air are quite common in the atmosphere and are part of the weather phenomenon. Liquid droplets sized the order of microns and smaller follow almost perfectly the movement or flow of the air due to the viscous forces described by Stokes law. The smaller the liquid droplets are the better they follow the air trajectory. Fog is therefore to be understood not as just the liquid droplets that are dispersed in air, but as a fluid itself made both of liquid droplets and a gas (e.g. air). This is because the air and micron sized and sub-micron sized liquid droplets essentially flow in unity (the liquid droplets do not move very much independently of the air around them). This is essentially due to the nature and dynamics of viscous fluids described by Stoke's law. FIG. 7 shows the trajectories that spherical liquid droplets follow when injected vertically downwards (y-axis) at a speed of 1 m/s into a horizontal flow of air moving at 1 m/s from left to right (x-axis). It is shown how 10 micron droplets injected at 1 m/s just penetrate a bit longer than 1 mm before flowing in unity with the flow of air. The smaller the droplets are, the shorter the penetration is to finally follow the fluid flow. A 1 micron droplet is shown to penetrate only a few hundredth of a millimeter (that is just tens of microns) which is almost their size. The effect for smaller than 1 micron droplets is even more drastic: particles and droplets smaller than 1 micron will follow the fluid trajectories within the order of magnitude of their own size. It is therefore impossible to efficiently inject droplets smaller than 1 micron in air or gas and expect their independent movement in the fluid.

Dynamics of liquid droplets in air is in fact quite complex, particularly under certain conditions. First, surface tension (also called surface energy) attempts to minimize surface/volume ratio for the liquid droplets. For this reason, liquid droplets are spherical in still air.

The mechanical equilibrium on the liquid-air interface was long ago described by T. Young (Philosophical Transactions of the Royal Society of London, 95 (1805) 65) as:

$$2 \cdot K \cdot \gamma = P_i - P_o$$

where $\gamma$ is the surface tension, $P_i$ is the inside pressure (in the liquid) $P_o$ is the outside pressure (in the air) and K is the mean curvature of the surface. This mean curvature can be also written as—

$$K = \frac{1}{2} \cdot \left(\frac{1}{R_1} + \frac{1}{R_2}\right)$$

where $R_1$ and $R_2$ are the main radii of curvature of the surface. In the case of a sphere both radii are radius of the sphere. This implies that the smaller a spherical liquid droplet is the higher the inside pressure.

Contrary to the teaching of International Publication No. WO 91/01794, this fact does not cause them to grow and coalesce in any way. Only when two droplets touch they then aggregate if the final surface $S_f$ is smaller than the sum of the two original droplets $S_1+S_2$. Compressibility of water is so small that the term of energy associated to pressure in the liquid is really negligible and internal pressure per se does not contribute to aggregation.

In fact it is not necessary that the liquid droplets touch themselves for the process of aggregation to begin. It is enough that they approach at a distance for which the Gibbs free energy balance of aggregation becomes favorable. In practical terms, if two droplets are at the same temperature they will aggregate if $(S_1+S_2-S_f)\cdot\gamma-E_v \geq 0$, where $E_v$ is the energy dissipated by the associated movement of air and droplets when both droplets move to touch and aggregate. This relative movement necessarily implies moving air apart which eventually dissipates energy. Given two spherical droplets in still air, we can define an "aggregation distance" as the maximum distance between them at which aggregation occurs. In other words, if the liquid droplets are spaced apart by more than the aggregation distance they will not move closer to aggregate. If the liquid droplets are spaced apart by less than the "aggregation distance" they will spontaneously move closer to one another and eventually aggregate. The aggregation distance will depend on the sizes and shapes of both liquid droplets.

In the case of two droplets made of a first and second types of liquid the balance of energy can be calculated taking into account the different values of surface tension for the several kind of interfaces: first liquid-air $\gamma_1$, second liquid-air $\gamma_2$, mixture of first and second liquid-air $\gamma_{(1+2)}$. The condition for aggregation will become $(S_1\cdot\gamma_1+S_2\cdot\gamma_2-S\cdot\gamma_{(1+2)})-E_v \geq 0$.

Similarly, in the case of a liquid droplet and a solid particle, assuming that the particle enters completely into the liquid droplet conserving its shape and volume in case of aggregation, the same expression is valid taking $\gamma_1$ and $\gamma_{(1+2)}$ as the liquid-air surface tension and $\gamma_2$ as the difference between solid-air surface tension and solid-liquid surface tension.

Surface tension of water-air interfaces is known to depend on temperature and humidity as described previously by one of the inventors (Pérez-Diaz et al. "The effect of the partial pressure of water vapor on the surface tension of the liquid water-air interface." Journal of colloid and interface science vol. 381, 1 (2012): 180-2). Its value can range between 60 and 76 millinewton/meter (mN/m). This means, for example, for a 100 nanometer water droplet the difference between internal and external pressure will range between 87 psi and 110 psi. This means that the generation of such tiny water droplets in air in a nozzle, irrespective of its type, need stresses of the order of the difference between internal and external pressure. This can be only achieved efficiently if water and compressed air are supplied at pressure close to the cited range.

Interaction between liquid droplets and air becomes more complex when the air is no longer still. An acceleration of air results in the air moving relative to the surface of the droplet. This causes the shape of the droplet to deform into an ellipsoid and also induces vibrational modes. Additionally, air velocity gradients will induce shear stresses in the liquid droplets due to the viscosity of the air.

This movement of air may drastically change the aggregation distance as the decrease in surface area changes as well. For instance, for two spherical droplets with the same radius, the surface of the aggregated droplet—being its volume the addition of those of the two original droplets—is 41.2% lower than the addition of the surfaces of the two original spherical droplets. For a couple of ellipsoidal droplets of the same size the surface area drop when aggregating is also 41.2%. However, the surface area of an ellipsoid with a ratio 10:4 between its long and short axes is 13% higher than that of a sphere with the same volume. This grows to 70% in the case of an ellipsoid with a ratio of 10:1 between its long and short axes. This increase in surface area has a double beneficial effect to promote aggregation increasing the volume of air within the aggregation distance from any of the droplets as both the aggregation range and the surface grow simultaneously with respect to the spherical case. Therefore, the likelihood for aggregation to occur between two droplets grows according to the square of their surface areas. In other words, the likelihood for aggregation to occur between two stressed 10:1 ellipsoidal droplets (ellipsoids with a ratio of 10:1 between its long and short axes) is 2.89 times higher than that of two relaxed spherical droplets of the same volume.

Additionally, accelerations and decelerations of the air flow produce relative flow of air with respect of the particle or droplet; while for steady flow the particle or droplet would assume the velocity of the air with no relative motion between the air and particle or droplet. This means that acceleration greatly increases the likelihood of aggregation as it increases the likelihood of other air-borne droplets or particles flowing with air to come into the aggregation distance.

Figure 1:
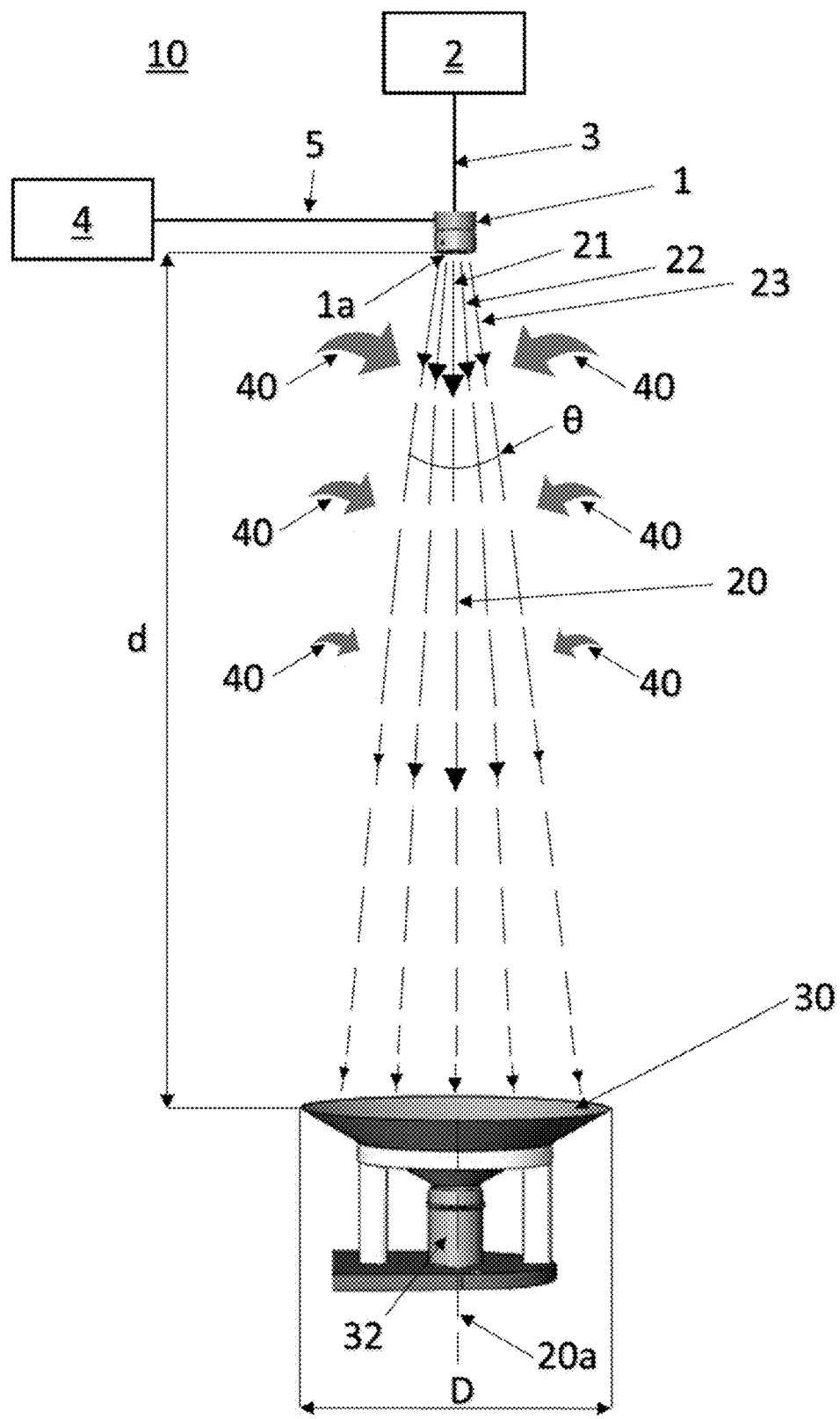
FIG. 1 illustrates an apparatus for sampling air-borne particles according to one implementation.

FIG. 1 is a schematic of a sampling apparatus for obtaining a sample of air-borne particles according to one implementation. In each of the implementations disclosed and contemplated herein, the motive by which particles in the air surrounding the sampling apparatus are collected is facilitated by a fast and expanding jet of fog 20 that is produced by a nozzle 1. Spaced apart from an outlet 1a of the nozzle 1, and situated in a downstream path of the jet of fog 20, is a sample collecting surface 30 on which the jet of fog 20 ultimately impacts. The sample collecting surface 30 is preferably a sloped surface having an opening at its lowest end through which aggregated liquid droplets (that carry particles extracted from the surrounding air 40) pass and are collected inside a vial or other type of collection container 32. As shown in FIG. 1, the cone-shaped jet of fog 20 is generated such that the air and liquid droplets at the central axis 20a of the jet of fog move at a greater speed than the air and liquid droplets at the boundary of the cone (see velocity vectors 21, 22 and 23, wherein 21 has a greater velocity than 22 which has a greater velocity than 23). The manner in which the jet of fog 20 is produced also results in there being a pressure gradient that exists between the central axis 20a of the jet of fog and boundary of the cone. As a result of the aforesaid velocity and pressure gradients, air 40 and associated particles surrounding the sampling apparatus 10 are drawn into the jet of fog 20 where they are mixed as shown in FIG. 1. FIG. 1 schematically shows the surrounding air 40 being dragged or drawn into the jet of fog 20 along its border. According to some implementations, the jet of fog 20 is generated such that it is capable of drawing the surrounding air 40 into the jet of fog 20 at 0.01 m$^3$/s to 2.0 m$^3$/s. For this reason, according to some implementations the sampling time (that is, the time in which the jet of fog 20 is generated and drawing in the surrounding air 40) is less than 1 second. According to other implementations the sampling time is between 1 second and 5 minutes. A salient feature of the sampling apparatus 10 is its capability of sampling large volumes of surrounding air 40 in relation to the size of the jet of fog it produces. According to some implementations the distance "d" between the distal end 1a of the nozzle 1 and the sample collecting surface is between 150 mm and 600 mm, the cone angle "0" of the jet of fog 20 is between 4 to 50 degrees (preferably between 6 to 25 degrees) and the diameter "D" of the sample collecting surface 30 is between 100 mm and 400 mm. In sampling devices suitable for sampling air in large spaces, such as a subway terminal, the distance between the distal end of the nozzle and the sample collecting surface can be larger, such as, for example, up to 5 meters.

According to some implementations, the liquid droplets and the air in the jet of fog 20 travel at a speed between 5 m/s and 20 m/s measured at the central axis 20a and at a distance of 100 mm downstream the outlet 1a of the nozzle 1. The high speed of the jet of fog and the pressure gradient between the central axis 20a of the jet of fog 20 and the surrounding air 40 causes a large flow of the surrounding air 40 to be drawn into and mixed with the fog. This results in a large acceleration of the particles as they are drawn into the fog, which in turn promotes an aggregation of the particles with the liquid droplets. The dragging or drawing effect reaches meters away from the nozzle 1, enabling a large volume of air 40 mainly entering radially into the jet of fog 20 at a location near the distal end 1a of the nozzle 1. Once captured inside the jet of fog 20, the air 40 is forced in an axial direction towards the sample collecting surface 30. This radical change of direction contributes to the large acceleration of the air 40 and the accompanying particles.

The jet of fog 20 decelerates as it approaches the sample collecting surface 30 in an axial direction of flow, and then experiences a radial outwards acceleration upon impacting the sample collecting surface 30. Each of these favor effective aggregation. Eventually, aggregated/merged droplets, carrying the captured particles in them, become big enough to be collected by impaction against the surface 3 as shown in FIG. 1. The distance between nozzle 1 and surface 30 must be long enough to enable the development of the jet of fog 20. Preferably longer than 100 mm and most preferable longer than 160 mm. The diameter of the sample collecting surface 30 should be adequate to receive an entirety of the end of the jet of fog 20. Finally the liquid, with the particles (e.g. pathogens and pollutants) in it, flows down through an opening surrounded by the sample collection surface to the vial 4 where it can be collected. According to some implementations the sample collecting surface 30 is comprised in a funnel. According to some implementations the sample collecting surface 30 is hydrophilic to enhance aggregation of the liquid droplets at the surface.

For an effective impaction against the sample collecting surface 30, the size of aggregated droplets at the end of the jet of fog need to become bigger than their original size, typically at least one order of magnitude larger than their original size. With the objective of achieving a rapid aggregation of liquid droplets, a cascade effect is promoted using a jet of fog that comprises liquid droplets of different sizes, the sizes typically being of the same order of magnitude of the air-borne particles to be captured which can be up to a few microns.

Trajectories of droplets with different sizes will differ in accelerated conditions which favors collisions and aggregation. To capture viruses and ultrafine particles, a fog comprising mostly nanometer-size (nanometric) liquid droplets is required. However, if liquid droplets of varying size, up to, for example, a size of 1 micron, is injected uniformly into the jet of fog, cascade aggregation is promoted and the effect is much more effective and faster. Liquid droplets will aggregate/merge with slightly smaller ones progressively growing and changing trajectory. A relatively uniform variation in size of liquid droplets in the cone will ensure an immediate and fast cascade effect. The nozzle described in EP3395449 and particularly its improvement described in WO 2021/214354 A1 provides such an adequate jet of fog when water and compressed air (typically between 60 and 170 psi) are supplied to the nozzle. An optimal droplet size distribution is obtained when water pressure delivered to the nozzle is lower than that of the air that is delivered to the nozzle.

Turning again to FIG. 1, to produce a jet of fog having liquid droplets of a micron or less, the nozzle 1 is configured to receive a pressurized liquid (such as water) from a liquid source 2 via conduit 3 and a pressurized gas (such as air) from a gas source 4 via conduit 5. Inside the nozzle 1, the liquid is atomized to produce at the outlet 1a of the nozzle 1 the jet of fog 20 comprising nano-sized liquid droplets as discussed above. According to some implementations, the liquid and gas are compressed at a pressure of 90 to 160 psi with the liquid pressure being slightly below the gas pressure. The pressurization of the gas and water produces an expansion that results in the jet of fog 20 traveling greater than 5 meters/sec and preferably greater than 8 meters/sec, measured at the central axis 20a and at a distance of 100 mm downstream the outlet 1a of the nozzle.

To recap, according to the present invention, the jet of fog 20 is made of a suspension of smaller than 1 micron liquid droplets in a gas that are each injected at pressure, expanding and creating a broadening cone with relatively high speed that generates a lateral suction of the surrounding air 40 (and air-borne matter in it). Lateral collisions are then produced by the mixing of the fog in the cone and the surrounding air 4 to be sampled. This lateral mixing and colliding is efficiently enhanced by the velocity gradient from inside and outside the jet of fog.

Figure 2:
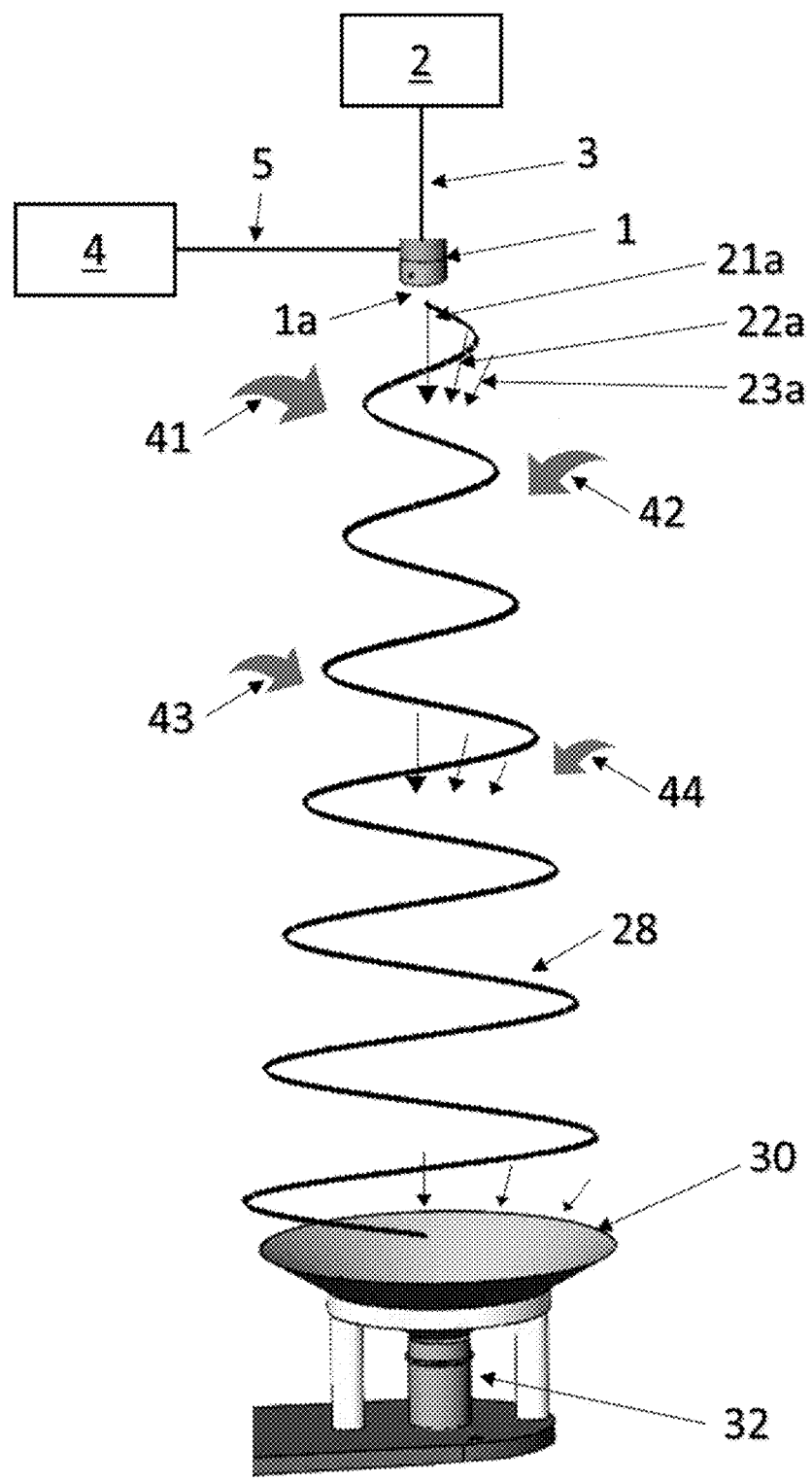
FIG. 2 is a illustrates an apparatus for sampling air-borne particles according to another implementation.
Figure 3:
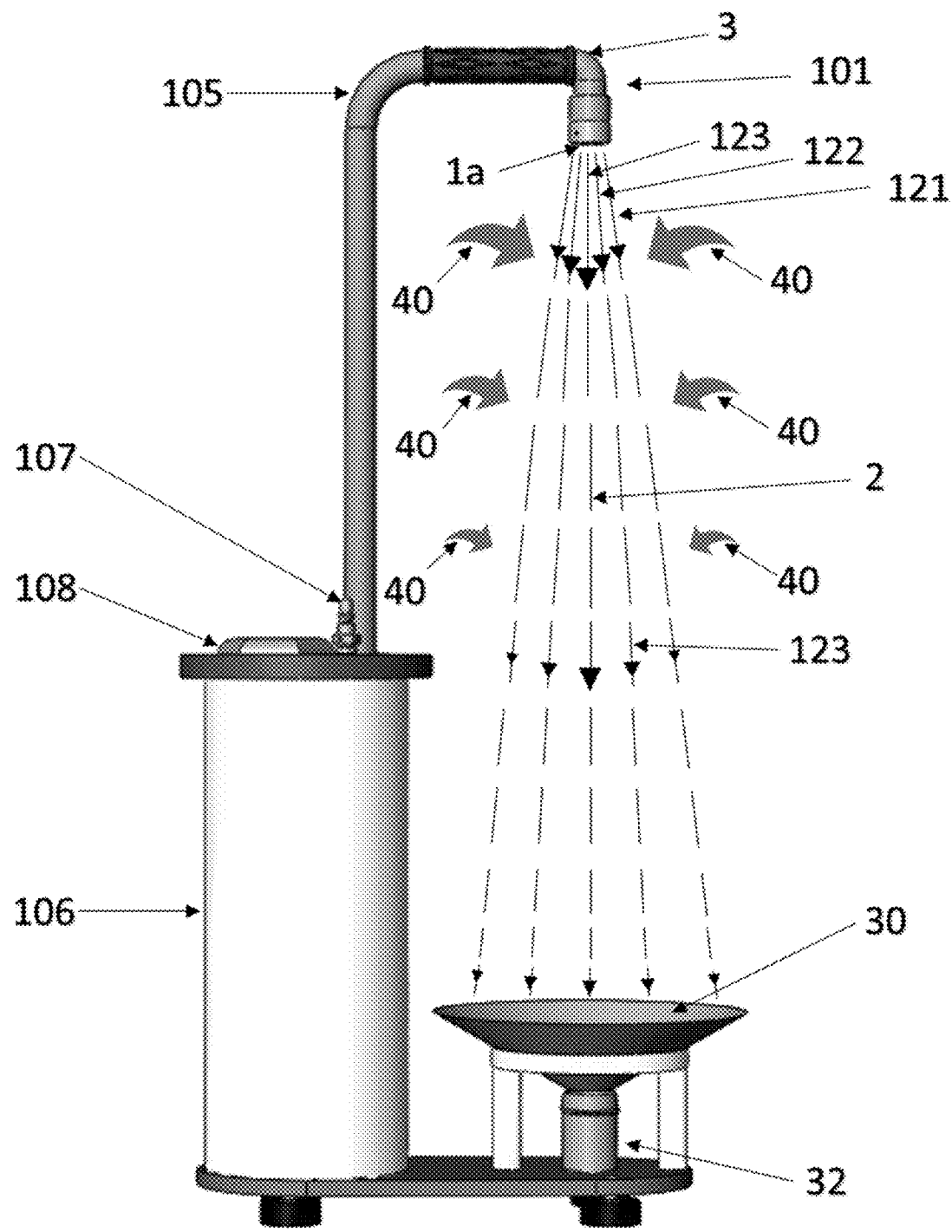
FIG. 3 shows an apparatus for sampling air-borne particles according to yet another implementation.

In the implementation of FIG. 1, the nozzle 1 is configured to direct the jet of fog 20 in an essentially straight line path towards the sample collecting surface 30. However, according to another embodiment, as shown in FIG. 2, the nozzle 1 is configured to cause the jet of fog 20 to swirl as it exits the nozzle so that the jet of fog follows a helical or partial helical route 28 as it travels between the outlet 1a of the nozzle 1 and the sample collecting surface 30. The swirling motion induced by the nozzle improves aggregation making the cone more stable and efficient. This is due to several factors: first a radial acceleration is added to the motion stressing and shearing the liquid droplets; second, centrifugal spiral trajectories are created for the liquid droplets in the jet of fog 20, while centripetal spiral trajectories are generated for particles from the surrounding air 40; and third, rotational motion combined with axial motion lengthens time of flight (the time it takes for the liquid droplets to travel from the outlet of the nozzle 1 to the sample collecting surface 30. These factors promote both an aggregation of particles into the liquid droplets of the jet of fog, and also an aggregation of the liquid drops as they advance towards the sample collecting surface 30. FIG. 2 schematically shows velocity vectors (arrows) 41, 42, 43 and 44 for the surrounding air 40 being dragged or drawn into the jet of fog 20. The velocity of 41 is greater than the velocity of 42, which is greater than the velocity of 43, which is greater than the velocity of 44. The velocity vectors of the jet of fog are shown as arrows 21a, 22a and 23a.

Figure 8:
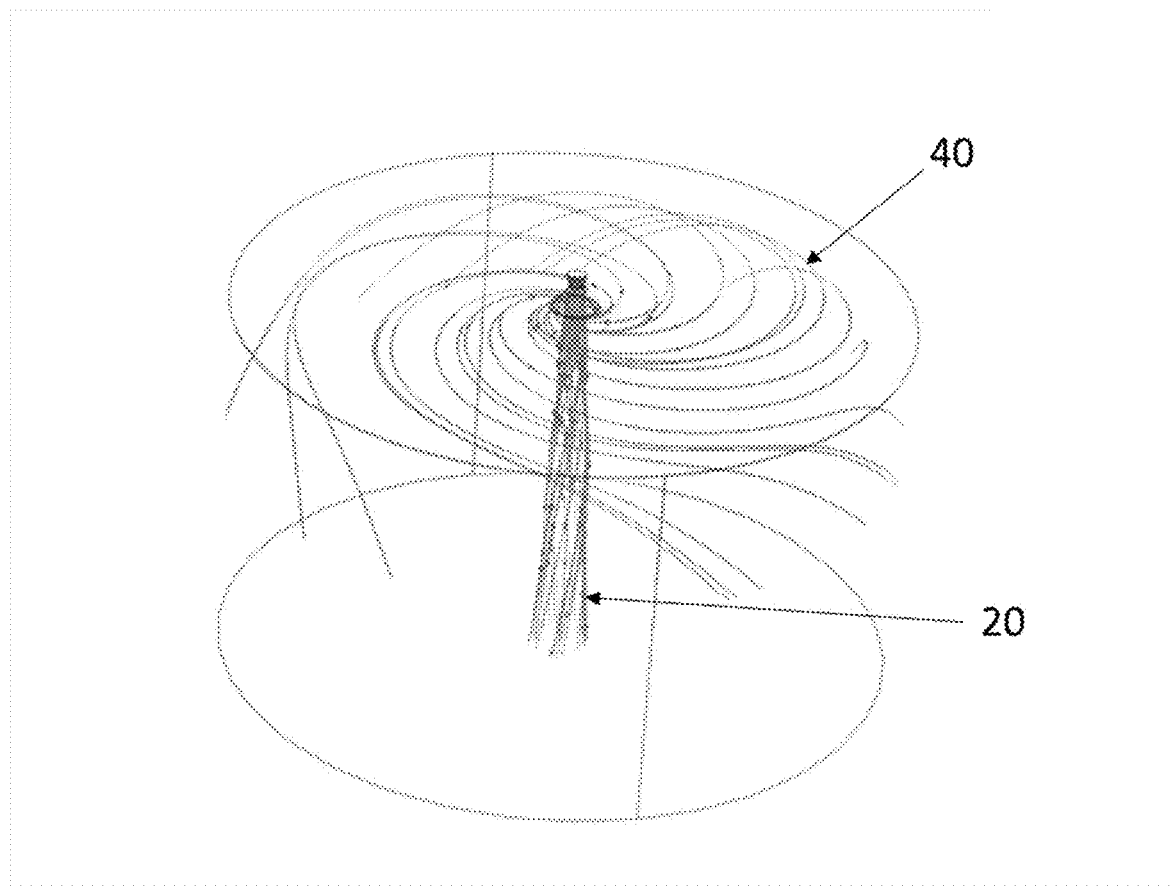
FIG. 8. show a view of streamlines of surrounding air being drawn into a swirling jet of fog as the jet of fog is injected in an open volume.
Figure 9:
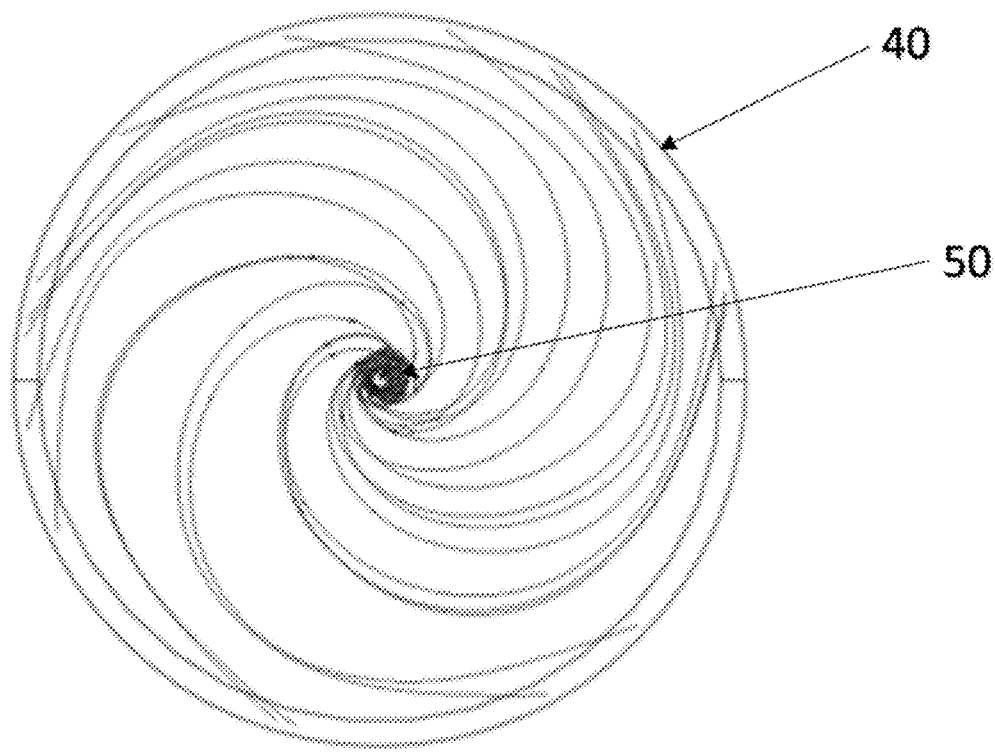
FIG. 9 is a top view of streamlines of air being drawn into a swirling jet of fog as the jet of fog is injected in an open volume.

FIG. 8 shows a view of streamlines of the surrounding air 40 and the jet of fog 20 when the jet of swirling fog is injected in an open volume. Note that the largest portion of the surrounding air 40 is drawn into the swirling jet of fog in a region near the outlet 1a of the nozzle 1. In this region most of the surrounding air 40 is accelerated centripetally (and spirally) and is thereafter abruptly dragged in a downward direction. FIG. 9 shows a top view of streamlines of air 40 being dragged into a central region 50 of the fog 20 making evident the spiral progressive acceleration.

Figure 4:
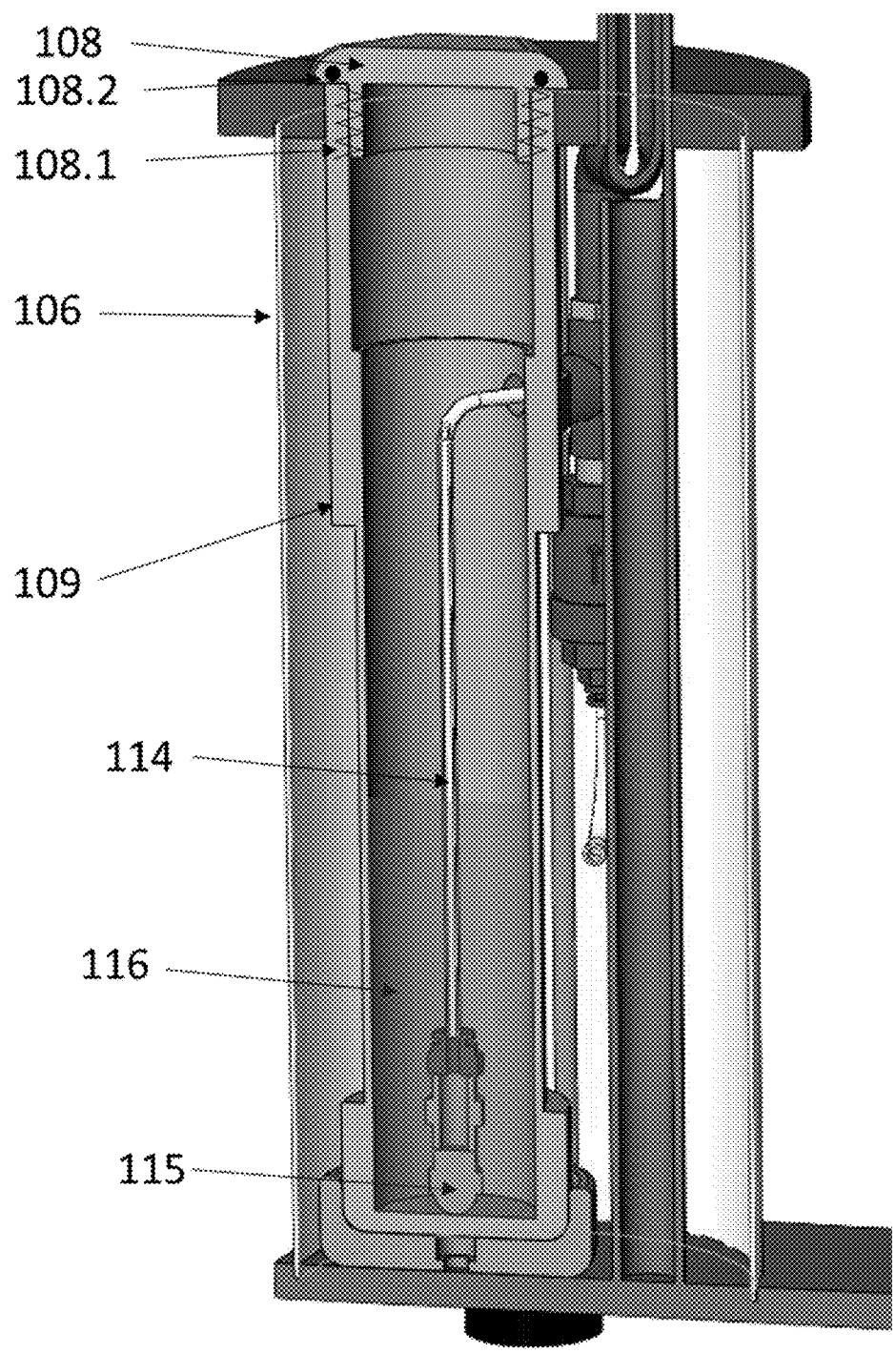
FIG. 4 shows a cross-section view of a main body of the sampling apparatus of FIG. 3.

FIGS. 3 through 6 illustrate a sampling apparatus 100 according to another implementation. According to some implementations the nozzle 101 is configured to produce a jet of fog 120 having the same characteristics as the jet of fog 20 discussed above in conjunction with the sampling apparatus 10 of FIG. 1. According to other implementations the nozzle 101 is configured to produce a jet of fog having the same characteristics as the jet of fog discussed above in conjunction with the sampling apparatus of FIG. 2. According to some implementations the nozzle 101 has a construction similar to the nozzle disclosed in International Publication No. WO 2021/214354 A1 which is incorporated by reference herein in its entirety. According to some implementations, the nozzle 101 includes a first internal chamber for receiving a compressed gas (e.g. compressed air) and a second internal chamber for receiving a compressed liquid (e.g. compressed water). The sampling apparatus 100 includes a main body 106 that is provided with a compressed air connector 107 to be connected to a compressed air filtered line or just to a small conventional oil-free air compressor not shown in the figures. Inside the main body 106 is a liquid container 109 that stores a liquid 116 to be delivered to the nozzle 101. The main body 106 also includes a lid 108 that can be opened to facilitate a filling of the container 109 with the liquid. As will be discussed in more detail below, when a compressed gas is delivered into the liquid container 109, the liquid inside the container is forced from the container into a conduit connected to the second chamber of the nozzle 101. The lid 8 as shown in FIG. 4 is provided with a screw geometry 108.1 and a seal 108.2 to provide an airtight closure. After closing the lid 108, oil-free filtered compressed air can be supplied to the main body 106 through the compressed air connector 107.

Figure 5:
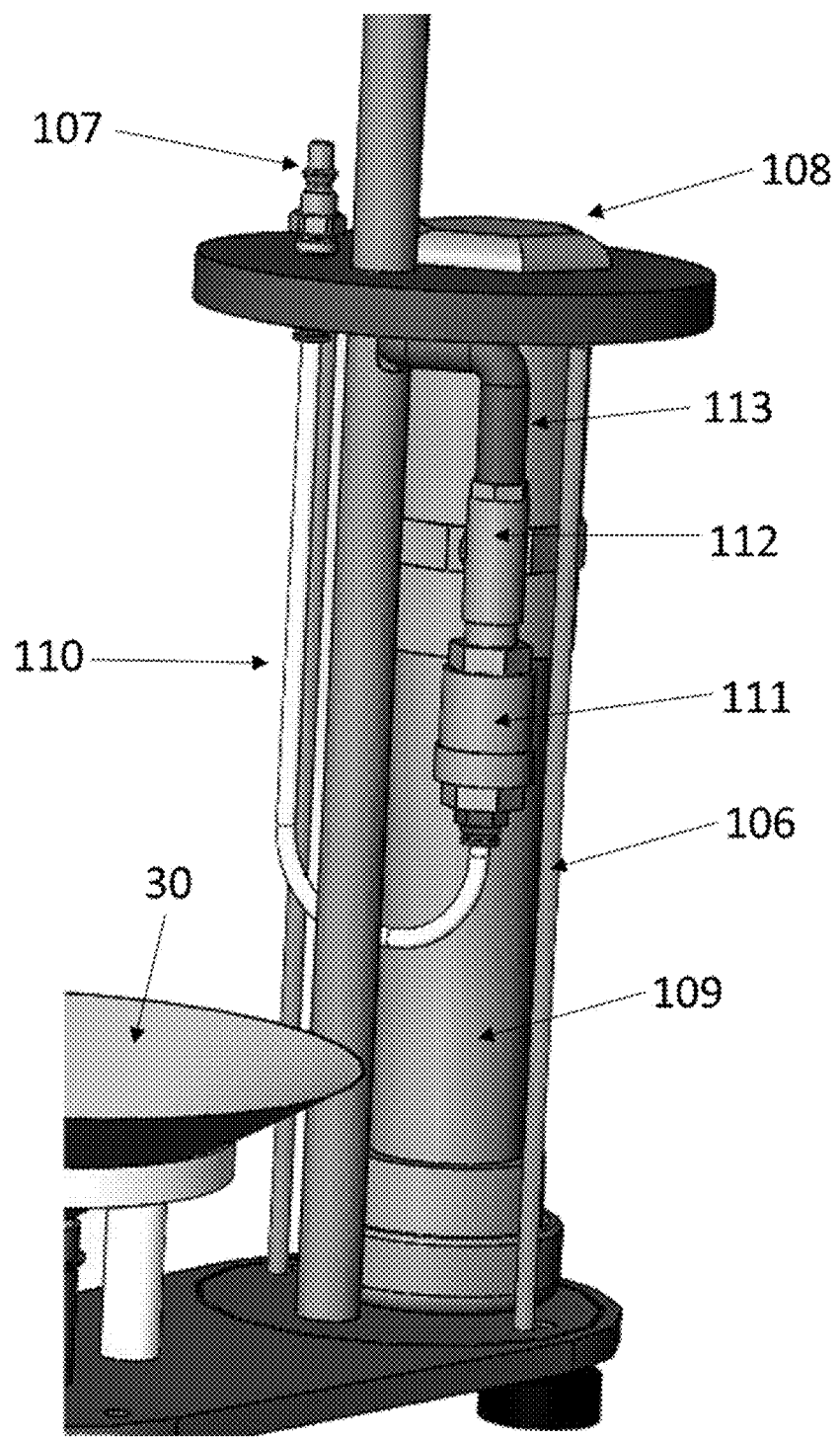
FIG. 5 shows the sampling apparatus of FIG. 3 with an outer shell of the main body removed.
Figure 6:
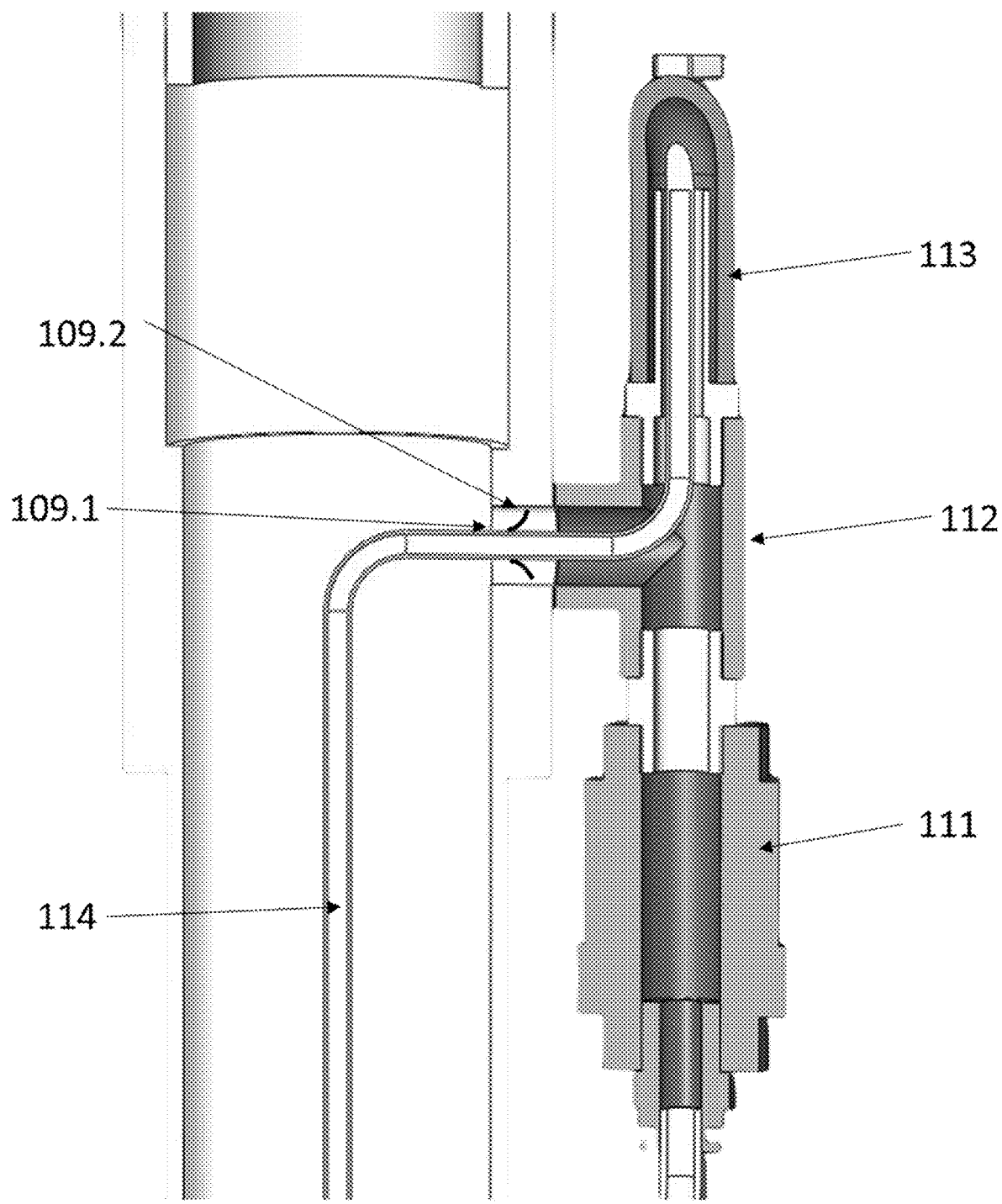
FIG. 6 shows fluid connections of the sampling apparatus of FIG. 3.
Figure 7:
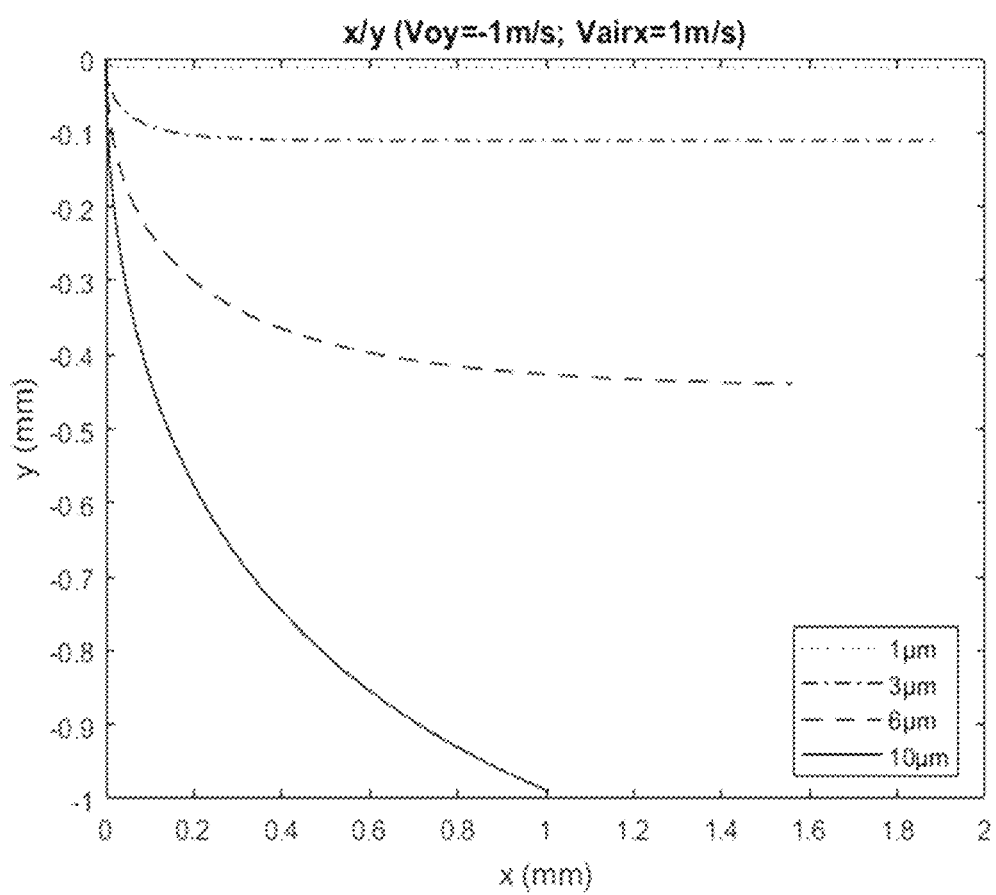
FIG. 7 is a graph showing the trajectories spherical liquid droplets follow when injected vertically (y-axis) at a speed of 1 m/s vertically downwards into a horizontal flow of air moving at 1 m/s from left to right (x-axis).

The compressed air connector 107 is connected through an air pipeline 110 as shown in FIG. 5 to a check valve 111. A filter for compressed air (not shown in the figures) can be also optionally provided separately or integrally connected to the pipeline 110 to prevent particles coming in through with the compressed air. The check valve 111 is connected to a "T" shaped connector 112 that is in fluid communication with both the container 109 through a hole 109.1 and to the external part of a flexible coaxial pipe 113, supplying compressed air to both as shown in FIG. 6. Optionally hole 109.1 can be provided with a flexible membrane 109.2 fixed on its periphery and drilled on its center to let pass a liquid pipeline 114. The flexible membrane 109.2 will act as a check valve preventing liquid 116 to flow back out through the hole 109.1 in case that there is an excess of liquid in the container 109.

The liquid pipeline 114 is connected to a liquid filter 115. Liquid 116 poured in the container 109 is pushed down by the compressed air supplied through the hole 109.1. The liquid is therefore forced to flow through the liquid filter 115 into the liquid pipeline 114. The liquid pipeline 114 passes out of the container through the hole 109.1 (and membrane 109.2) and "T" shaped pipe 112 and continues as the inner pipeline of the flexible coaxial pipe 113. The flexible coaxial pipe 113 is inserted in the coaxial pipe 105 which is connected to the nozzle 101. The liquid pipeline 114 is connected to the liquid inlet of nozzle 101, while the outer part of the coaxial pipe 105 is connected to the compressed air inlet of nozzle 101. Compressed air flows through the flexible coaxial pipe 113 and through coaxial pipe 105 to the air inlet of the nozzle 101. The compressed air presses the flexible coaxial pipe 113 against the walls of the coaxial pipe 105 preventing air to flow back between the flexible coaxial pipe 113 and the coaxial pipe 105. The flexible coaxial pipe 113 has an internal cross-sectional area that is small enough to cause a pressure drop to the liquid flowing through it causing the effective liquid pressure in the liquid inlet of nozzle 101 to be lower than the air pressure in the compressed air inlet of nozzle 101. The benefits associated with delivering the liquid to the nozzle at a pressure lower than the gas is discussed above.

According to an alternative implementation, connection to the nozzle 101 may be made with just the flexible coaxial pipe 113, without the use of the rigid coaxial pipe 105. Such an implementation allows for an easy altering of the position of the nozzle 101, enabling an altering of the distance between the nozzle 101 and the sample collecting surface 30 or to enable the nozzle 101 to be directed to different sample collecting surfaces. This advantageously allows the sample apparatus to be adaptable in geometry and function to different sampling sites.

According to yet another implementation, the sample collection surface 30 is moveable with respect to the nozzle 1 or 101 so that the distance between them may be varied.

With continued reference to FIGS. 3 through 6, in use an oil-free air compressor or a compressed air line is connected to the air connector 107 for a controlled time (typically from 30 seconds to 2 minutes). During the time of activation a large flow of air is drawn in by the jet of fog 120 where the air-borne particles aggregate with the liquid droplets and the liquid droplets aggregate with one another so that they may be collected on the sample collecting surface 30 and eventually in vial 32. The liquid sample collected in the vial 32 can then be directly analyzed to determine its contents.

The method to sample air-borne matter consists on selecting a liquid adequate for the kind of pollutants or particles to capture. Water, distilled water or serum is a good option for hydrophilic particles; PBS is a good option to enable cultivation of microorganisms or viruses; while a few percentage of isopropanol in water enables capturing all kind of particles including hydrophobic ones. Chemical substances in gaseous or vapor state can also be solved in the droplets quite efficiently due to the high surface to volume ratio and the high air volume sampled. A liquid can selected for which the targeted chemical specie is soluble.

Tests were conducted in which air samples containing coronavirus disease 19 (COVID-19) were obtained in a patient's room or bathroom located inside a hospital. Air samples were obtained using a sampling apparatus according to the jet of fog concepts disclosed herein and also using a filtration sampling apparatus (i.e. PTFE filters). The sample apparatus using the jet of fog concept was similar to the sampling apparatus of FIG. 3, with the distance between the nozzle and the sample collecting surface being 550 mm and an outermost diameter of the sample collecting surface being 160 mm. The sample collecting surface comprised an inner surface of a funnel having a 55 mm diameter bottom hole.

Samples were obtained using a swirling jet of fog generated by the nozzle. Air was supplied to the nozzle at a pressure of 7.1 bar and liquid containing 0.1% bovine serum albumin in phosphate buffered saline (commonly known as "PBS") was supplied to the nozzle at a pressure of 7.0 bar. The sample time varied between 1.5 minutes and 3 minutes with surround air being drawn into the swirling jet of fog at around 4 $m^3$/min. The samples were collected in 60 mm diameter and 75 mm high standard flasks located below the bottom opening of the sample collecting funnel. The samples were then concentrated to 2 ml with an Amicon 50 kDa.

Viral RNA retained in filters and Counterfog liquid sample were extracted with the Maxwell® RSC Viral Total Nucleic Acid Purification Kit (Promega) in a Maxwell® RSC 48 Instrument (Promega). Purified RNA was analyzed in triplicate by RT-qPCR targeting the N gene (N1 and N2 amplicon) from SARS-CoV-2, and positive samples were considered only when ⅔ replicates were positive. Synthetic SARS-CoV-2 RNA control (Twists Bioscience) was used to build a standard curve for quantification of RNA copies.) These values were compared to samples taken with PTFE filters —in this case for 100 min filtering 30l/min air.

The apparatus according to the present invention obtained values of virus concentration in air between 12 and 1157 viral RNA genomes/$m^3$ while the values of the PTFE filters were between 150 and 650. The value obtained in the filters is an average of the concentration in air over a period of time of generally at least one half an hour while the present invention takes samples in a much shorter time.

Other tests were conducted to sample an aerosol of Bacteriophage Phi 19 viruses. Using the same sampling apparatus as described above, and using mineral water as the liquid, the surrounding air was drawn into the swirling jet of fog at around 4 $m^3$/min for a time period of 2 minutes. Air was supplied to the nozzle at a pressure of 5.7 bar and the water was supplied to the nozzle at a pressure of 7.2 bar Samples obtained using the jet of fog concept were compared to samples taken by filtration with PTFE filters developed by CSIC. The PTFE filter method involved filtering the aerosol at a rate of 30 liters/minute for a time period of 10 minutes. Systematically, the system of the present invention recovered between 100 and 1000 times more viable viruses per volume of dragged or filtered air than the PTFE fitlers under the same circumstances.

The following set of clauses disclose additional implementations.

Clause 1. An apparatus for sampling particles transported in air, the apparatus comprising:
 a nozzle having a first inlet configured to receive a pressurized gas and a second inlet configured to receive a pressured liquid, the nozzle being configured to mix the pressured gas and the pressurized liquid to generate at an outlet of the nozzle a swirling jet of fog that comprises the gas and a plurality of liquid droplets dispersed in the gas, the plurality of liquid droplets comprising droplets of different volumes of 1 cubic micron or less, the nozzle being configured to produce the jet of fog in a way that results in the plurality of liquid droplets being shear stressed by the gas to cause the plurality of liquid droplets to be ellipsoidal, the jet of fog being generated by the nozzle to cause the particles transported in air surrounding the jet of fog to merge with the ellipsoidal liquid droplets; and a sample collecting surface located in a downstream flow path of the swirling jet of fog, the sample collecting surface being located opposite the outlet of the nozzle, a straight line distance between the outlet of the nozzle and the sample collecting surface being sufficient for at least some of the ellipsoidal liquid droplets containing the particles to merge with one another inside the swirling jet of fog before impacting the sample collecting surface.

Clause 2. The apparatus according to clause 1, wherein the plurality of liquid droplets comprises droplets having a volume of 0.7 cubic microns or less.

Clause 3. The apparatus according to clause 1, wherein the plurality of liquid droplets comprises droplets having a volume of 0.5 cubic microns or less.

Clause 4. The apparatus according to any of the preceding clauses, wherein the sample collecting surface is a sloped surface.

Clause 5. The apparatus according to any of the preceding clauses, wherein the sample collecting surface is a cone-shaped surface of a funnel.

Clause 6. The apparatus according to clause 5, wherein the funnel includes a bottom opening.

Clause 7. The apparatus according to clause 6, further comprising a container configured to hold a liquid located below the bottom opening of the funnel.

Clause 8. The apparatus according to any of the preceding clauses, further comprising a pressurized gas source fluidly coupled to the first inlet of the nozzle and a pressurized liquid source fluidly coupled to the second inlet of the nozzle, the pressurized gas source configured to deliver to the first inlet of the nozzle the pressurized gas at a first pressure, the pressurized liquid source configured to deliver to the second inlet of the nozzle the pressurized liquid at a second pressure lower than the first pressure.

Clause 9. The apparatus according to any of the preceding clauses, further comprising a pressurized gas inlet connection and a tank for holding a liquid, the pressurized gas inlet collection being in fluid communication with the tank and also in fluid communication with the first inlet of the nozzle, the tank being in fluid communication with the second inlet of the nozzle.

Clause 10. The apparatus according to clause 9, wherein a first conduit fluidly couples the pressurized gas inlet connection with the first inlet of the nozzle and a second conduit fluidly couples the tank to the second inlet of the nozzle, at least a portion of the second conduit being located inside the first conduit.

Clause 11. The apparatus according to clause 9, wherein a first conduit fluidly couples the pressurized gas inlet connection with the first inlet of the nozzle and a second conduit fluidly couples the tank to the second inlet of the nozzle, the first conduit having a first diameter and the second conduit having a second diameter less that the first diameter.

Clause 12. The apparatus according to any of the preceding clauses, wherein the sample collecting surface is a hydrophilic surface.

Clause 13. The apparatus according to any of the preceding clauses, wherein the nozzle is moveable with respect to the sample collecting surface to facilitate altering the distance between the nozzle and the sample collecting surface.

Clause 14. The apparatus according to any of the preceding clauses, wherein the sample collecting surface is moveable with respect to the nozzle to facilitate altering the distance between the nozzle and the sample collecting surface.

Clause 15. The apparatus according to any of the preceding clauses, wherein the distance between the outlet of the nozzle and the sample collecting surface is between 150 millimeters and 600 millimeters.

Clause 16. The apparatus according to any of the preceding clauses, wherein the gas is air and the liquid is water.

Clause 17. The apparatus according to any of the preceding clauses, wherein the nozzle is configured to generate the swirling jet of fog to have a cone angle of 4 to 50 degrees.

Clause 18. The apparatus according to any of the preceding clauses, wherein the sample collecting surface has a maximum diameter of 100 to 400 millimeters.

Clause 19. The apparatus according to clause 4, further comprising a sample collection container located below the sloped surface.

Clause 20. The apparatus according to any of the preceding clauses, wherein there is no mechanical structure located between the swirling jet of fog and the surrounding air, nor between the outlet of the nozzle and the sample collecting surface.

Clause 21. A method for sampling particles transported in air, the method comprising:

generating by the use of a nozzle a swirling jet of fog that comprises a gas and a plurality of liquid droplets dispersed in the gas, the plurality of liquid droplets comprising droplets of different volumes of 1 cubic micron or less, the plurality of liquid droplets being shear stressed by the gas to cause the liquid droplets to be ellipsoidal, the jet of fog being generated by the nozzle to cause the particles transported in air surrounding the jet of fog to merge with the ellipsoidal liquid droplets; and causing at least some of the ellipsoidal liquid droplets containing the particles to merge with one another inside the swirling jet of fog; and collecting the merged ellipsoidal liquid droplets containing the particles on a sample collecting surface.

Clause 22. The apparatus according to clause 21, wherein the plurality of liquid droplets comprise droplets having a volume of 0.5 cubic microns or less.

Clause 23. The method according to any one of clauses 21 and 22, wherein the sample collecting surface is a sloped surface.

Clause 24. The method according to clause 23, further comprising collecting the merged liquid droplets containing the particles inside a sample collection container located below the sloped surface.

Clause 25. The method according to clause 24, wherein the merged liquid droplets containing the particles flow into the sample collection container only by gravitational force.

Clause 26. The method according to any one of clauses 21-25, wherein the swirling jet of fog is configured to draw in the surrounding air at a rate of 0.017 m$^3$/s to 20 m$^3$/s.

Clause 27. The method according to anyone of clauses 21-26, wherein the jet of fog is generated for a time period of 1 second to 5 minutes.

Clause 28. The method according to anyone of clauses 21-26, wherein the jet of fog is generated for a time period of 1 minute to 3 minutes.

Clause 29. The method according to any one of clauses 21-28, wherein the swirling jet of fog has a cone angle of 4 to 50 degrees.

Clause 30. The method according to any one of clauses 21-29, wherein the sample collecting surface is sized such that an entirety of an end of the swirling jet of fog impacts on the sample collecting surface.

Clause 31. The method according to any one of clauses 21-30, wherein at least some of the plurality of liquid droplets travel between an outlet of the nozzle and the sample collection surface at a speed of greater than 8 m/s.

Clause 32. The method according to any one of clauses 21-31, wherein the gas and a liquid are mixed inside the nozzle to produce the swirling jet of fog, the gas being delivered to a first inlet of the nozzle at a first pressure, the liquid being delivered to a second inlet of the nozzle at a second pressure less than the first pressure.

Clause 33. The method according to any one of clauses 21-32, wherein the gas is air and the plurality of liquid droplets are water droplets.

Clause 34. The method according to any one of clauses 21-33, wherein the sample collecting surface is a hydrophilic surface.

Clause 35. The method according to any one of clauses 21-34, wherein the swirling jet of fog is an open jet of fog.

What is claimed is:

1. An apparatus for sampling particles transported in air, the apparatus comprising:
   a nozzle having a first inlet configured to receive a pressurized gas and a second inlet configured to receive a pressurized liquid, the nozzle being configured to mix the pressurized liquid and the pressurized liquid to generate at an outlet of the nozzle a swirling jet of fog that comprises the gas and a plurality of liquid droplets dispersed in the gas, the plurality of liquid droplets comprising droplets of different volumes of 1 cubic micron or less, the nozzle being configured to produce the jet of fog in a way that results in the plurality of liquid droplets being shear stressed by the gas to cause the plurality of liquid droplets to be ellipsoidal, the jet of fog being generated by the nozzle to cause the particles transported in air surrounding the jet of fog to merge with the ellipsoidal liquid droplets; and
   a sample collecting surface located in a downstream flow path of the swirling jet of fog, the sample collecting surface being located opposite the outlet of the nozzle, a straight line distance between the outlet of the nozzle and the sample collecting surface being sufficient for at least some of the ellipsoidal liquid droplets containing the particles to merge with one another inside the swirling jet of fog before impacting the sample collecting surface,
   wherein there is no mechanical structure located between the swirling jet of fog and the surrounding air, nor between the outlet of the nozzle and the sample collecting surface.

2. The apparatus according to claim 1, wherein the plurality of liquid droplets comprises droplets having a volume of 0.5 cubic microns or less.

3. The apparatus according to claim 1, wherein the sample collecting surface is a sloped surface.

4. The apparatus according to claim 3, further comprising a sample collection container located below the sloped surface.

5. The apparatus according to claim 1, wherein the sample collecting surface is a cone-shaped surface of a funnel.

6. The apparatus according to claim 5, wherein the funnel includes a bottom opening.

7. The apparatus according to claim 6, further comprising a container configured to hold a liquid located below the bottom opening of the funnel.

8. The apparatus according to claim 1, further comprising a pressurized gas source fluidly coupled to the first inlet of the nozzle and a pressurized liquid source fluidly coupled to the second inlet of the nozzle, the pressurized gas source configured to deliver to the first inlet of the nozzle the pressurized gas at a first pressure, the pressurized liquid source configured to deliver to the second inlet of the nozzle the pressurized liquid at a second pressure lower than the first pressure.

9. The apparatus according to claim 1, further comprising a pressurized gas inlet connection and a tank for holding a liquid, the pressurized gas inlet collection being in fluid communication with the tank and also in fluid communication with the first inlet of the nozzle, the tank being in fluid communication with the second inlet of the nozzle.

10. The apparatus according to claim 9, wherein a first conduit fluidly couples the pressurized gas inlet connection with the first inlet of the nozzle and a second conduit fluidly couples the tank to the second inlet of the nozzle, at least a portion of the second conduit being located inside the first conduit.

11. The apparatus according to claim 9, wherein a first conduit fluidly couples the pressurized gas inlet connection with the first inlet of the nozzle and a second conduit fluidly couples the tank to the second inlet of the nozzle, the first conduit having a first diameter and the second conduit having a second diameter less that the first diameter.

12. The apparatus according to claim 1, wherein the sample collecting surface is a hydrophilic surface.

13. The apparatus according to claim 1, wherein the nozzle is moveable with respect to the sample collecting surface to facilitate altering the distance between the nozzle and the sample collecting surface.

14. The apparatus according to claim 1, wherein the sample collecting surface is moveable with respect to the nozzle to facilitate altering the distance between the nozzle and the sample collecting surface.

15. The apparatus according to claim 1, wherein the distance between the outlet of the nozzle and the sample collecting surface is between 150 millimeters and 600 millimeters.

16. The apparatus according to claim 15, wherein the sample collecting surface has a maximum diameter of 100 to 400 millimeters.

17. The apparatus according to claim 1, wherein the gas is air and the liquid is water.

18. The apparatus according to claim 1, wherein the nozzle is configured to generate the swirling jet of fog to have a cone angle of 4 to 50 degrees.

* * * * *

UNITED STATES PATENT AND TRADEMARK OFFICE
CERTIFICATE OF CORRECTION

| | |
|---|---|
| PATENT NO. | : 11,808,673 B2 |
| APPLICATION NO. | : 17/687066 |
| DATED | : November 7, 2023 |
| INVENTOR(S) | : José Luis Pérez Diaz |

It is certified that error appears in the above-identified patent and that said Letters Patent is hereby corrected as shown below:

In the Claims

Column 15, Line 27, Claim 1 change "the pressurized liquid and the pressurized liquid" to --the pressurized gas and the pressurized liquid--.

Signed and Sealed this
Twenty-seventh Day of February, 2024

Katherine Kelly Vidal
*Director of the United States Patent and Trademark Office*